United States Patent Office 3,232,949
Patented Feb. 1, 1966

3,232,949
PROCESS OF MANUFACTURING BRANCHED-CHAIN MONO-OLEFINIC ALIPHATIC ACIDS AND INTERMEDIATES THEREFOR
Kent C. Brannock, Kingsport, Tenn., assignor to Eastman Kodak Company, Rochester, N.Y., a corporation of New Jersey
No Drawing. Filed Oct. 12, 1961, Ser. No. 144,568
The portion of the term of the patent subsequent to Mar. 19, 1980, has been disclaimed
4 Claims. (Cl. 260—294.3)

This application is a continuation-in-part of my co-pending U.S. patent application Serial No. 50,830, filed August 22, 1960, now U.S. Patent No. 3,082,251.

This invention relates to the manufacture of branched-chain mono-olefinic aliphatic acids and to novel intermediates therefor.

I have found that when an enamine of the type

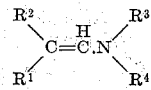

in which $R^1$ is an alkyl group, $R^2$ is hydrogen, and $R^3$ and $R^4$ are alkyl groups, or divalent organic radicals which together with the nitrogen atom to which they are attached form a fully hydrogenated heterocyclic ring, is allowed to react with an acetylenic compound of the type $X.C{\equiv}C.Y$, in which X is hydrogen or a monovalent organic radical and Y is a carbalkoxy or cyano group, a carbon skeletal rearrangement occurs and a novel compound is formed having the structure (I) 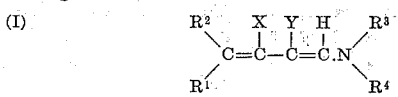

In which $R^1$, $R^2$, $R^3$, $R^4$, X and Y have the same significance as above. The latter compound is a valuable chemical intermediate in the production of branched-chain mono-olefinic carboxylic acids in accordance with the invention. Treatment of this compound with aqueous acid results in hydrolysis of the dialkylamino group, giving a compound (II) 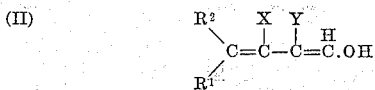

which, in turn, can be hydrolyzed with aqueous alkali, such as sodium hydroxide, which replaces the hydroxymethylene group by two hydrogen atoms and saponifies the ester group or groups giving a compound

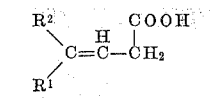

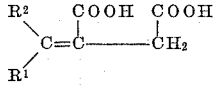

or

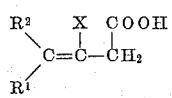

depending upon whether X was hydrogen, carbalkoxy or a radical not susceptible to saponification.

My invention is illustrated, but not limited, by the following example.

*Example*

N-(1-butenyl)-piperidine (14 grams, 0.1 mole) was dissolved in 25 ml. of ether and dimethyl acetylenedicarboxylate (14 grams, 0.1 mole) was added dropwise over a one-hour period at 35 to 40° C. Distillation of the reaction mixture gave, after removal of solvent and low-boilers, 14 grams (50% yield) of dimethyl 2-piperidinomethylene-3-propylidene succinate, B.P. 150–156° at 1.5 mm., $n_D^{20}$ 1.5354.

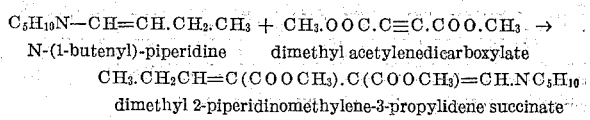

Hydrolysis of 11 grams of the latter compound with dilute hydrochloric acid at room temperature gave 4 grams (48% yield) of dimethyl 2-hydroxymethylene-3-propylidene succinate, B.P. 93–96° C., at 1 mm., $n_D^{20}$ 1.4833. Saponification of 3 grams of the latter with aqueous sodium hydroxide followed by acidification, gave 1.7 gram (77% yield) of 2-propylidene succinic acid, M.P. 166–7° C. (decomposition).

The enamines employed in my process are of the type

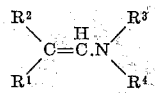

in which $R^1$ is an alkyl group, $R^2$ is hydrogen and $R^3$ and $R^4$ are alkyl groups or divalent organic radicals which, with the nitrogen atom to which they are attached, form a fully hydrogenated heterocyclic ring. $R^1$, $R^3$ and $R^4$ can be any straight or branched chain lower alkyl group having, for example, 1 to about 4 carbon atoms, e.g., methyl, ethyl, propyl, isopropyl, normal butyl, isobutyl, secondary butyl, or tertiary butyl. $R^3$ and $R^4$ can also be divalent organic radicals, e.g., alkylene radicals, divalent radicals composed of carbon, hydrogen and oxygen atoms, etc., which form with the nitrogen atom to which they are attached a fully hydrogenated heterocyclic radical such as morpholino, pyrrolidinyl or piperidino. Enamines employed in my process can be prepared by the reaction of a secondary amine with an aldehyde having two hydrogen atoms attached to the α-carbon atom. Examples of suitable enamines include: N-(1-butenyl)piperidine, N,N-dimethylvinylamine, N,N-dimethylpropenylamine, N - (1-butenyl)pyrrolidine, N,N-dimethyl-1-butenylamine, N,N-dibutyl-1-butenylamine, N-(1 - heptenyl)morpholine, and the like.

The acetylenic compounds employed in my process are of the type, $X.C{\equiv}C.Y$, wherein X is a monovalent organic radical, such as hydrogen, alkyl, aryl, carbalkoxy, cyano, etc. and Y is a carbalkoxy or cyano group. I have illustrated my process with acetylenic compounds in which Y is a carbalkoxy group derived from a lower alkanol, specifically, methanol or ethanol. While I do not wish to be bound by theoretical explanations of the mechanism of the reaction that takes place in my process, it appears that the carbon skeletal rearrangement occurring in the reaction depends upon the radical Y being an electron-withdrawing group in a conjugated position with respect to the acetylenic triple bond. The process is therefore broadly applicable to various carbalkoxy radicals or to the cyano radical as Y in the acetylenic compound, $X.C{\equiv}C.Y$, and to a wide range of monovalent organic radicals as X. Preferably Y is a carbalkoxy group derived from a straight or branched-chain lower alkanol such as methanol, ethanol, 1-propanol, 2-propanol, 1-butanol, 2-methyl-1-propanol, 2-butanol and 2-methyl-2-propanol. X can be any monovalent organic radical that does not adversely affect the course of the reaction and can include various radicals of this kind, e.g., alkyl, aryl, cyano, and carbalkoxy radicals or hydrogen. Preferably, X is hydrogen or a carbalkoxy radical derived from a lower alkanol.

Examples of suitable acetylenic compounds having substituents X and Y of the type indicated include: methyl propiolate, ethyl propiolate, n-propyl phenylpropiolate, i-butyl propiolate, methyl cyclohexylpropiolate, diethyl acetylenedicarboxylate, ethyl cyanopropiolate, cyanoacetylene, dimethyl acetylenedicarboxylate, ethyl tetrolate, etc.

Conversion of the substituted enamine (I) to the substituted alcohol (II) is accomplished by hydrolysis of the amino group. Any procedure for hydrolysis of enamines can be employed. The preferred procedure comprises mixing the compound (I) with at least an equimolar amount of an aqueous solution of an inorganic acid or strong organic acid such as hydrochloric, sulfuric, phosphoric, oxalic, acetic, etc. The hydrolysis proceeds readily at room temperature but can be performed at higher or lower temperature, e.g., 0° C. to reflux temperature.

The conversion of the alcohol (II) to a branched-chain monoolefinic aliphatic acid in accordance with the invention is accomplished by hydrolysis with aqueous alkali. As shown in the examples this reaction can be carried out at room temperature merely by mixing compound (II) with at least an equimolar amount of an aqueous solution of a base such as sodium hydroxide, potassium hydroxide, barium hydroxide or the like. Higher or lower temperatures can also be used.

Utility of teraconic acid is shown in U.S. Patent 2,469,377 of Flett. 4-methyl-3-pentenoic acid is readily converted by hydrogenation to isohexanoic acid, or by treatment with mineral acid to isocaprolactone. The utility of acids and lactones of this type, as well as the utility of dibasic aliphatic acids, is well known in the art.

The invention has been described in considerable detail with particular reference to certain preferred embodiments thereof, but it will be understood that variations and modifications can be effected within the spirit and scope of the invention as described hereinabove, and as defined in the appended claims.

I claim:

1. A process of manufacturing a branched-chain monoolefinic aliphatic acid having the structural formula

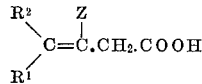  (1)

in which R¹ is an alkyl group, R² is hydrogen and Z is selected from the group consisting of hydrogen and carboxyl, which comprises allowing an enamine having the structural formula

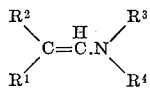  (2)

in which R³ and R⁴ are selected from the group consisting of alkyl groups and divalent organic radicals which together with the nitrogen atom to which they are attached form a fully hydrogenated heterocyclic radical selected from the group consisting of morpholino, pyrrolidinyl and piperidine, to react with an acetylenic compound having the formula $$X.C{\equiv}C.Y \qquad (3)$$

in which X is selected from the group consisting of hydrogen and carbalkoxy and Y is carbalkoxy, to give a compound having the structural formula

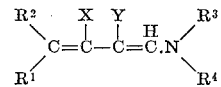  (4)

hydrolyzing this compound by means of aqueous acid to give a compound having the structural formula

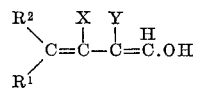  (5)

and hydrolyzing this latter compound by means of an aqueous alkali to give a branched-chain monoolefinic aliphatic acid of the structural formula shown at (1) in this claim, the significance of R¹, R², R³, R⁴, X and Y being constant throughout the claim.

2. A compound of the structure

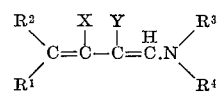

wherein R¹ is a lower alkyl group, R² is selected from the class consisting of hydrogen and lower alkyl groups, R³ and R⁴ are selected from the class consisting of lower alkyl groups and divalent organic radicals which with the nitrogen atom to which they are attached form a heterocyclic radical selected from the group consisting of morpholino, pyrrolidinyl and piperidino, X is selected from the class consisting of hydrogen and a lower carbalkoxy radical, and Y is a lower carbalkoxy radical.

3. A process of manufacturing a lower alkyl diester of 2-piperidinomethylene-3-propylidenesuccinic acid which comprises combining (N-(1-butenyl)-piperidine with a lower alkyl diester of acetylenedicarboxylic acid.

4. Dimethyl 2-piperidinomethylene-3-propylidene succinate.

References Cited by the Examiner
UNITED STATES PATENTS
3,082,251   3/1963   Brannock _____ 260—526

NICHOLAS S. RIZZO, *Primary Examiner.*

DANIEL D. HORWITZ, LEON ZITVER, *Examiners.*